United States Patent Office 3,475,507
Patented Oct. 28, 1969

---

3,475,507
METHOD OF PRODUCING LABELED POLYNUCLEAR COMPOUNDS
John Andrew Sedlak, Stamford, Conn., assignor to American Cyanamid Company, Stamford, Conn., a corporation of Maine
No Drawing. Filed Oct. 13, 1967, Ser. No. 675,048
Int. Cl. C07c *15/12, 15/20*
U.S. Cl. 260—668                                8 Claims

---

ABSTRACT OF THE DISCLOSURE

Aromatic compounds, such as polynuclear fused ring aromatic compounds of at least 4 rings, or those containing at least 3 non-fused conjugated aromatic rings, are significantly deuterated in comparatively high yield by an exchange reaction by using $D_3PO_4 \cdot BF_3$ as a source of deuterium, preferably at a D/H ratio of about 100 to 1 or higher; and a solvent free from readily exchangeable hydrogen such as $SO_2$ or an aromatic compound having powerful electron-withdrawing deactivating groups such as ortho-dichlorobenzene. Tritiation may be similarly accomplished.

---

CROSS REFERENCES TO RELATED APPLICATIONS

Application Ser. No. 332,752, Dec. 23, 1963, and now abandoned, Stamm et al. "Metastable Electronic States" discloses the usages of polynuclear condensed aromatic ring compounds in photochromic filters.

Application Ser. No. 408,718, Oct. 30, 1964, R. F. Stamm, "Long-Lived Metastable Electronic States" discloses the use of deuterated compounds of the same nature for photochromic filters.

DESCRIPTION OF THE PRIOR ART

The use of organic compounds in which ordinary hydrogen is at least in part replaced by deuterium or tritium is common for labeling to identify a molecule.

Some deuterated compounds are uniquely useful in their own right, as for example, shown in U.S. Patent 3,303,177, Giulio Natta, Mario Peraldo, and Mario Parina, Substantially Linear, Regularly Head-to-Tail Polymers of Deuterated and Tritiated Monomers and Process for Producing the Same, Feb. 7, 1967.

One method which has been used for deuteration is platinum catalyzed exchange: J. L. Garnett, Nucleonics, 20, No. 12, 86 (1962), also W. G. Brown and J. L. Garnett, J. Am. Chem. Soc., 80, 5272 (1958).

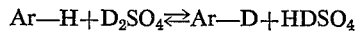
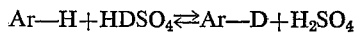

where Ar is an aromatic ring.

The heterogeneous nature of the platinum-catalyzed reaction necessitates intimate contact between the metal surface and the organic compound. Also, the organic compound must be removable from the catalyst surface at temperatures low enough to avoid extensive decomposition. Therefore, the compound to be deuterated is preferably a liquid, or a solid that can be readily dissolved in a solvent. Aromatic solvents such as benzene are recommended. However, deuteration of these solvents competes with the desired deuteration. Consequently, unless costly perdeuterated solvents are used, it is necessary to perform several equilibration cycles to minimize deuterium wastage and obtain extensive exchange. This method works well with some low molecular weight compounds. However, many polynuclear aromatic compounds are solids which are only slightly soluble in ordinary organic solvents, and are not economically deuterated by such a system.

Another exchange system is described by C. K. Ingold, et al., J. Chem. Soc. 1637 (1936) using dideuterosulfuric acid:

$$Ar-H + D_2SO_4 \rightleftarrows Ar-D + HDSO_4$$
$$Ar-H + HDSO_4 \rightleftarrows Ar-D + H_2SO_4$$

Sulfonation often is a serious side-reaction, greatly lowering the yield.

Exchange of hydrogen of higher weight can be accomplished using $TH_2PO_4 \cdot BF_3$ or the deuterium analog as described by P. M. Yavorsky and E. Gorin, J. Am. Chem. Soc., 84, 1071 (1962) "New Reagent for Labeling Organic Compounds With Tritium." The labeling is shown for low molecular weight compounds such as benzene, toluene, naphthalene, and anisole.

J. G. Atkinson, M. O. Luke, and R. S. Stuart, Canadian Journal of Chemistry, 45, 1511 (1967) "A Simplified Preparation of Fully Deuterated, High Molecular Weight Hydrocarbons" disclose exchange of hydrogen for deuterium in hydrocarbons over carbon-supported, fixed-bed catalyst of rhodium, platinum, and palladium at 190° to 200° C. This technique is limited in that aromatic compounds are always transformed into saturated deuterated products.

Nguyen Dinh-Nguyen and Einar Strenhagen, Acta Chem. Scand., 20, 1423 (1966) "A Convenient Process for the Synthesis of Organic Compounds of High Deuterium Content" show exchange of deuterium for hydrogen in the presence of an alkali, a metal catalyst of the type used for hydrogenation, and a suitable peroxide promoter. This process appears to be limited to the preparation of saturated compounds.

SUMMARY OF THE INVENTION

It has now been found that polycyclic aromatic compounds may be substituted by heavy hydrogen, that is hydrogen of a mass number greater than 1, namely deuterium and/or tritium, by reacting, in hydrogen exchange relationship, such compounds with $H_3PO_4 \cdot BF_3$ at least a substantial number of the hydrogens of which are of mass number greater than 1, usually referred to as D or T for mass numbers 2 and 3, in the presence of an inert solvent, preferably by heating. In contrast with the processes described above, aromatic compounds of high molecular weight can be significantly deuterated in good yield while being maintained in the unsaturated aromatic state. A single exchange equilibration can be sufficient to produce a high degree of deuteration.

Inasmuch as deuterium is more readily available than tritium and is free from radioactivity, the present discussion and examples are largely thereto. Similar experiments are readily conducted using tritium, provided suitable personnel protection is maintained against radiation.

For tracer applications, a small proportion of substitution of tritium or deuterium may be all that is desired. For applications such as shown in the Stamm application, supra, a highly deuterated compound is preferred. Complete deuteration, or perdeuteration, is a theoretical impossibility in an exchange type reaction, but with D/H ratios of 100 or over, substantially complete deuteration may be accomplished. By choice of an adequate D/H ratio, or by staged deuteration at successively higher D/H ratios, any desired degree of deuteration can be realized.

The reactions may be summarized:

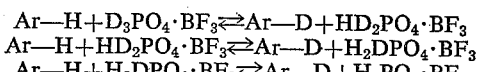

where Ar is an aromatic ring.

The deuteration is an equilibrium process, so it is possible to obtain high degrees of exchange by using high atomic ratios of deuterium to hydrogen of mass 1, abbreviated as D/H. The degree of deuteration may be readily measured by infrared spectroscopy, which detects a residual 5% hydrogen. Mass spectrometry may be used if greater sensitivity is desired.

The temperature of reaction must be below that at which an unacceptable degree of decomposition occurs. Below such temperature the exchange rate increases with temperature. Usually a temperature between about 50° C. and 150° C. gives a preferred relationship between a reasonable time for reaction and losses by decomposition.

The solvent must be one that is liquid at the temperature and pressure of the reaction. For sulfur dioxide, a sealed reaction vessel keeps the solvent liquid. For orthodichlorobenzene, pressure is not usually required, and the solvent remains liquid at both reaction temperatures and room temperature.

The solvent must be one in which the compound being deuterated is at least sparingly soluble. As the reaction is an exchange reaction, all of the reactants present need not be soluble in the quantity of solvent present. The less soluble compounds may require a somewhat longer time for reaction, with the dissolved portion in equilibrium with the solid aromatic compound.

The solvent must be one which is not subject to deuteration under the conditions of the reaction or one in which the rate of deuteration, and loss of deuterium thereby, is economically acceptable. Sulfur dioxide is a good solvent for many of the aromatic compounds to be deuterated. Certain aromatic compounds which contain no hydrogen of mass 1, such as perdeuterobenzene or hexafluorobenzene, are useful solvents and cannot consume deuterating agent. For economic reasons, losses of such solvents must be kept to a minimum. Aromatic compounds in which electron-attracting substituents are present on the ring are suitable solvents. The electrophilic substituent constants $\sigma_m^+$ and $\sigma_p^+$ as set forth, for example, by H. C. Brown and Y. Okamoto, J. Am. Chem. Soc., 80, 4979 (1958) are known for common substituents. Those substituents as positive as the combination of two chlorines in orthodichlorobenzene are such strong electron attractors that the electrons are partially withdrawn from the benzene ring, and the rate of exchange of hydrogen with deuterium becomes so low that losses of the deuterating agent by reaction with the solvent are economically acceptable. A combination of substituents confers inertness toward exchange if the sum of electrophilic substituent constants acting on each aromatic hydrogen is at least as large as about +0.25. Among such compounds which are useful as solvents are ortho-dichlorobenzene, meta-dichlorobenzene, 1, 2, 4 - trichlorobenzene, nitrobenzene, benzotrifluoride, benzonitrile, tetrafluorobenzene, alkyl benzoates, dichloronaphthalene, and nitronaphthalene. As the costs of the deuterating agent, solubilities, and value of the deuterated aromatic compound all vary, the acceptability of deuterating agent losses varies. The examples show certain preferred embodiments, but within the scope of this invention, other modifications exist. Obviously the preferred conditions are those which are most economical for specific compounds, with specific raw material costs, which of course may vary.

The term fused aromatic ring compounds is conventional terminology for compounds having at least two atoms common to two different aromatic rings. This includes compounds such as pyrene, which has two carbons common to two rings and one carbon common to three rings; compounds in which the rings are in a line, such as tetracene (also named naphthacene); compounds in which the rings are not in a straight line, such as chrysene; and compounds in which the rings are all fused, but not necessarily in a single system, such as binaphthyl. The fused rings may include heterocyclic atoms, such as in thebenidine, benzo[k,l]xanthene, benzo[b]naphtho[1,2-d]-thiophene, dibenzo[f,h]quinoxaline, 7H-benz[de]anthracen-7-one, or benz[a]acridine. Also included are systems with several rings such as coronene, benzo[a]coronene (also called 1,2-benzocoronene), dibenzo[a,g]coronene (also called 1,2-5,6-dibenzocoronene), perylene, benzo[g,h,i]perylene (also called 1,12-benzoperylene), tribenzo[e,ghi,k]perylene (also called 1,12–2,3–10,11-tribenzoperylene), and other number and position substituted perylenes.

The non-fused conjugated ring systems are those in which at least three aromatic rings are linked by single bonds which may assume double-bond character in at least one resonance form. These include

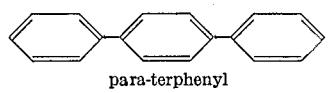

para-terphenyl and

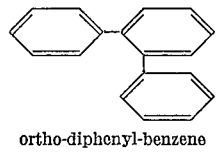

ortho-diphenyl-benzene

Both the fused and non-fused conjugated systems may be present as in

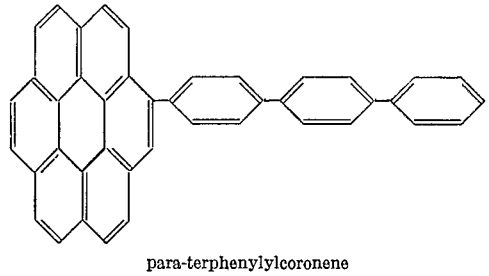

para-terphenylylcoronene

The compound being deuterated may have other substituents. For example, 4-(4-p-terphenylylmethyl)benzophenone is deuterated in the terphenylyl moiety, but the benzophenone ring electrons are so attracted by the electrophilic carbonyl group that exchange is inhibited; the alkyl hydrogens of the methylene bridge also do not exchange. Other bridged substituents may be present, and such substituents also may have effects in the photoactivation of the deuterated moiety.

Some authors use protium as a term to refer to hydrogen of mass 1. Here the term hydrogen is used and unless context indicates otherwise, refers to hydrogen as found in nature.

The nomenclature of the polycyclic compounds is not consistent in the literature. Generally the nomenclature of the Ring Index, second edition, A. M. Patterson, L. T. Capell, and D. F. Walker, American Chemical Society, Washington, D.C., 1960, with the supplements thereto, Ring Index Supplement, volumes 1, 2 and 3 are accepted. The nomenclature of Polycyclic Hydrocarbons, E. Clar, Academic Press, London and New York, 1964, is used in part. Both of these sources list many fused ring systems of four or more rings, representing compounds which may be deuterated or tritiated by the present process. Necessarily, to avoid undue length, both the text and examples are more limited than the full application of this invention. The classical texts of the Ring Index, including supplements, and Clar are incorporated by reference as disclosing additional ring systems capable of deuteration.

The present deuterated compounds are found to be of particular use in photochromic applications, where the greater mass of deuterium gives longer life to the triplet state. The compounds may also be used in tracer applications—and are of particular interest in metabolic studies, as the lengthened triplet state is regarded by some workers as having a bearing on proof of mechanisms in induction of neoplastic growth in tissues.

In the following examples, temperatures are in centigrade, and parts are by weight, unless clearly otherwise stated. Percent deuteration refers to the percent of H atoms replaced by D atoms. Where not specified, the percentage is by number of atoms. This may be different than by weight as for instance, a 33.3 atom percent replacement of hydrogen by deuterium, i.e., a D to H ratio of 1 to 2 in the product, is 50 weight percent substitution.

The examples are by way of illustration and the invention includes other obvious modifications of the examples set forth, as defined in the attached claims.

EXAMPLES

Preparation of $D_3PO_4 \cdot BF_3$.—A 250 ml. Pyrex flask was fitted with a Teflon-screw solids feeder and a Teflon-blade mechanical stirrer. The reaction mixture was isolated from the atmosphere by passing a slow stream of prepurified nitrogen through the vessel. In the flask was placed 19 ml. (21 g., 1.1 mole) of 99.8 mole percent $D_2O$. While stirring in an ice bath, 48.5 g. (0.34 mole) of phosphorus pentoxide powder was added through the screw feeder. During stirring for one hour in the ice bath and 18 hours at room temperature, the $P_2O_5$ dissolved to form a clear, viscous liquid.

Thereto, during one hour, 46 g. (0.68 mole) of boron trifluoride gas was introduced below the surface of the liquid with continuous stirring, with the flask being cooled in an ice bath. The resulting product was 116 g. (58 ml., 0.69 mole) of $D_3PO_4 \cdot BF_3$, a mobile liquid. The $D_3PO_4 \cdot BF_3$ was stored in a polyethylene flask until use.

General procedure used with sulfur dioxide solvent.— A Pyrex ampoule was charged by first adding the compound to be deuterated, condensing $SO_2$ in the ampoule cooled in Dry Ice-methylene chloride, and then adding $D_3PO_4 \cdot BF_3$ from a syringe. All operations were done under a dry nitrogen purge, to exclude air and moisture.

The ampoule was sealed by fusing the glass and was then sealed in an autoclave equipped for rocking agitation and temperature control. For reactions at 75° C. or 100° C. the interior of the autoclave was pressured with nitrogen at room temperature to 150 p.s.i. or 250 p.s.i., respectively, to compensate partially for the $SO_2$ vapor pressure. At 50° C., no pressure compensation was necessary.

After reaction was completed, the ampoule was cooled at $-75°$ C. and opened. Under a stream of prepurified nitrogen, the $SO_2$ was allowed to evaporate while the mixture warmed to room temperature during two to three hours. The mixture was cooled in ice and, with agitation, $D_2O$ or $H_2O$ was added in volume about one and one-third times that of the $D_3PO_4 \cdot BF_3$ used. The product was filtered through a sintered-glass funnel and the cake was washed with several portions each of $D_2O$ or $H_2O$, 5% aqueous sodium bicarbonate, and distilled water.

After drying at 50° C. under vacuum, the solid was stirred for four hours with a suitable volume of boiling xylene under nitrogen. The solution was chromatographed on alumina (Alcoa F-20), elution being monitored by ultraviolet light. Evaporation and recrystallization from xylene gave the product. The product was analyzed by infrared spectroscopy and/or mass spectrometry for deuterium content.

General procedure used with organic solvents.—The procedure used with sulfur dioxide was simplified, as the lower volatility of organic solvents permits room temperature operation in filling. After the undissolved deuterated product was separated by filtration, the solvent was evaporated at appropriate temperature and pressure to recover the dissolved product. The solvent may be recovered for reuse. Perdeuterobenzene warrants recovery. Inexpensive solvents, such as dichlorobenzene, usually need not be reclaimed. With a glass tube, sealing is simplified if the tube is cooled during the sealing operation. Appropriate protection is to be taken against pressure build-up and possible shattering of glass tubes. If metal autoclaves are used, for larger quantities, no extra precautions are required.

Example I.—1,2-benzocoronene (also named benzo[a]coronene) in sulfur dioxide

An ampoule was charged with 0.0700 g. ($2.00 \times 10^{-4}$ mole) of 1,2-benzocoronene, 7.9 ml. (15.8 g., 0.0935 mole) of $D_3PO_4 \cdot BF_3$, and 10 ml. of liquid anhydrous sulfur dioxide. The D/H atom ratio was 100/1. The ampoule was heated for 24 hours at 75° C. The resulting mixture consisted of a colorless upper liquid layer and a dark green lower liquid layer. After removing sulfur dioxide, etc., as outlined above, the product was dissolved in 850 ml. of xylene. On a 15 mm. x 330 mm. chromatography column, 2000 ml. of blue-fluorescent deuterated 1,2-benzocoronene solution eluted after a 250 ml. forecut. Tars and yellow-fluorescent and orange materials were left on the column. The infrared spectrum of the product showed a triplet in the aromatic C–D stretch region: 2300 cm.$^{-1}$, weakest; 2270 cm.$^{-1}$, strongest; 2250 cm.$^{-1}$, intermediate. There was no absorption due to aromatic C–H stretch of undeuterated 1,2-benzocoronene: 3080 cm.$^{-1}$, weakest; 3045 cm.$^{-1}$, strongest; 3015 cm.$^{-1}$, intermediate. Consequently, the product was established as about 100%-deuterated 1,2-benzocoronene. Mass spectrometric analysis showed that the product was made up of 74 mole percent $C_{28}D_{14}$, 21 mole percent $C_{28}D_{13}H$, 4 mole percent $C_{28}D_{12}H_2$, and 1 mole percent $C_{28}H_{14}$. Therefore, 97 percent of the hydrogen was replaced by deuterium.

Recrystallized yield, considering the product to be $C_{28}D_{14}$: 0.0511 g., $1.40 \times 10^{-4}$ mole, 70% of theoretical.

Example II.—Comparative example with no solvent

An ampoule was charged with 0.0200 g. ($5.72 \times 10^{-5}$ mole) of 1,2-benzocoronene and 4.0 ml. (8.0 g., 0.047 mole) of $D_3PO_4 \cdot BF_3$. The D/H atom ratio was 175/1. After heating at 75° C. for 24 hrs., the benzocoronene appeared to be largely unaffected.

The product was 10–15% deuterated and weighed 0.0175 g. The yield, considering the product to be $C_{28}H_{12}D_2$, was $4.95 \times 10^{-5}$ mole, 87%.

Example III.—Perdeuterobenzene solvent

Example II was repeated except that 12 ml. of $C_6D_6$ was added as a reaction solvent. Taking into account the deuterium contributed by the perdeuterobenzene, the D/H atom ratio was approximately 1100/1.

The product, 0.0180 g., was 50%-deuterated. The yield of $C_{28}H_7D_7$ was $5.04 \times 10^{-5}$ mole, 88%.

Example IV.—1,2,5,6-dibenzocoronene (also named dibenzo[a,g]coronene) in sulfur dioxide A stainless steel autoclave was charged with 1.94 g. ($4.85 \times 10^{-3}$ mole) of 1,2,5,6-dibenzocoronene, 226 ml. (451 g., 2.67 moles) of $D_3PO_4 \cdot BF_3$, and 460 g. of anhydrous sulfur dioxide. The D/H atom ratio was 100/1. The autoclave was heated for 24 hours at 75° C. After releasing the sulfur dioxide and then washing as described above for the general sulfur dioxide procedure, the solid obtained was dissolved in 7 l. of xylene. The solution was chromatographed to obtain 98%-deuterated 1,2,5,6-dibenzocoronene (mass spectrometric analysis). Recrystallization from 900 ml. of xylene gave 1.05 g. of product, a 52% yield considering the product to be $C_{32}D_{16}$.

Example V.—1,2,3,4,5,6-tribenzocoronene (also named tribenzo[a,d,g]coronene) in sulfur dioxide An ampoule was charged with 0.0144 g. ($3.20 \times 10^{-5}$ mole) of 1,2,3,4,5,6-tribenzocoronene, 4.0 ml. (8.0 g., 0.047 mole) of $D_3PO_4 \cdot BF_3$, and 12 ml. of liquid sulfur dioxide. The D/H atom ratio was 250/1. The ampoule was heated for 24 hours at 75° C.

The solid product was dissolved in 800 ml. of xylene and was chromatographed on a 10 mm. x 380 mm. column. After a nonfluoroescent forecut of 100 ml., 800 ml. of green-fluoroescent deuterated 1,2,3,4,5,6-tribenzocoronene solution was collected. Infrared analysis, sensitive to 5 mole percent hydrogen, showed no hydrogen (mass 1) in the product. The yield of $C_{36}D_{18}$ was 0.0066 g., $1.4 \times 10^{-5}$ mole, 44%.

Example VI.—Naphthocoronene (also named naphtho[2,3-a]coronene) in sulfur dioxide An ampoule was charged with 0.0300 g. ($7.50 \times 10^{-5}$ mole) of naphthocoronene, 5.9 ml. (11.8 g., 0.0698 mole) of $D_3PO_4 \cdot BF_3$, and 10 ml. of liquid sulfur dioxide. The D/H atom ratio was 175/1. The ampoule was heated for 24 hours at 75° C.

The product was dissolved in 700 ml. of xylene and chromatographed on a 15 mm. x 325 mm. column. In the first 700 ml., nothing eluted except a small blue-fluorescent band immediately preceding the green-fluorescent naphthocoronene band. Naphthocoronene was collected in the next 1000 ml. A red band and higher yellow-fluorescent materials were left on the column.

The product was perdeuterated naphthocoronene, according to infrared analysis. The yield was 0.0176 g., $4.22 \times 10^{-5}$ mole, 56%.

Example VII.—Dibenz[a,h]anthracene in sulfur dioxide

An ampoule was charged with 0.0500 g. ($1.80 \times 10^{-4}$ mole) of dibenz[a,h]anthracene, 7.1 ml. (14.2 g., 0.084 mole) of $D_3PO_4 \cdot BF_3$, and 10 ml. of liquid sulfur dioxide. The D/H atom ratio was 100/1. The ampoule was heated at 50° C. for 24 hours.

The crude product was dissolved in 275 ml. of xylene and chromatographed on a 18 mm. x 360 mm. column. The first 625 ml. eluted was blue-fluorescent due to deuterated dibenz[a,h]anthracene. Tars and green-fluorescent material were left on the column. Mass spectrometry showed that the product was 98%-deuterated dibenz[a,h]anthracene. The yield was 0.0376 g., $1.29 \times 10^{-4}$ mole, 72%.

Example VIII.—1,2,4,5-dibenzopyrene (also named naphtho[1,2,3,4-d,e,f]chrysene) in sulfur dioxide An ampoule was charged with a mixture of 0.0300 g. ($9.94 \times 10^{-5}$ mole) of 1,2,4,5-dibenzopyrene, 6.9 ml. (13.8 g., 0.0816 mole) of $D_3PO_4 \cdot BF_3$, and 10 ml. of liquid sulfur dioxide, and then heated at 50° C. for 24 hrs. The D/H atom ratio was 175/1.

A solution of the product in 250 ml. of xylene was chromatographed on a 10 mm. x 260 mm. column. The first 100 ml. collected was non-fluorescent but the next 400 ml. fluoresced green. Several bands were left near the top of the column.

The fluorescent solution contained 100%-deuterated 1,2,4,5-dibenzopyrene as determined by infrared spectroscopy. The yield was 0.0173 g., $5.47 \times 10^{-5}$ mole, 55%.

Example IX.—1,2,4,5,8,9-tribenzopyrene (also named dibenzo[h, rst]pentaphene) in sulfur dioxide An ampoule was charged with 0.0300 g. ($8.52 \times 10^{-5}$ mole) of 1,2,4,5,8,9-tribenzopyrene, 6.8 ml. (13.6 g., 0.0804 mole) of $D_3PO_4 \cdot BF_3$, and 10 ml. of liquid sulfur dioxide. The D/H atom ratio was 175/1. The ampoule was heated at 50° C. for 24 hours.

The product was dissolved in 350 ml. of xylene and chromatographed on a 10 mm. x 260 mm. column. The first 175 ml. eluted was not fluorescent. Then two blue-fluorescent fractions were collected, the first, 500 ml., and the second, 550 ml. Several bands, one dark purple, were left near the top of the column. The 500 ml. fraction turned from yellow to pink on standing under nitrogen for several hours but the 550 ml. fraction did not discolor.

The pink fraction yielded 0.0192 g. of pink crystals and the yellow fraction yielded 0.0005 g. of yellow crystals. Infrared analyses showed that both fractions were 80%-deuterated 1,2,4,5,8,9-tribenzopyrene. The yield of $C_{28}H_3D_{13}$ was 0.0197 g., $5.39 \times 10^{-4}$ mole, 63%.

Example X.—Dibenz[a,h]acridine in sulfur dioxide

An ampoule was charged with 0.0200 g. ($7.16 \times 10^{-5}$ mole) of dizbenz[a,h]acridine, 4 ml. (8.0 g., 0.0473 mole) of $D_3PO_4 \cdot BF_3$, and 12 ml. of liquid sulfur dioxide. The D/H ratio was 150/1. The dibenz[a,h]acridine was completely soluble at room temperature. The ampoule was heated at 100° C. for 72 hours.

After evaporation of the $SO_2$, the residue was slowly poured into a solution of 6.0 g. (0.15 mole) of sodium hydroxide in 50 ml. of water stirred in an ice bath. The resulting precipitate was separated by filtration and washed with several portions of distilled water. The precipitate contained a considerable amount of inorganic material resulting from etching of the reaction vessel. Infrared analysis of the solid showed an 80% exchange of hydrogen by deuterium in the dibenz[a,h]acridine.

Example XI.—4-(4-p-terphenylylmethyl)benzophenone in sulfur dioxide

An ampoule was charged with 0.0250 g. ($5.90 \times 10^{-5}$ mole) of 4-(4-p-terphenylylmethyl)benzophenone, 6.0 ml. (12.0 g., 0.071 mole) of $D_3PO_4 \cdot BF_3$, and 10 ml. of liquid sulfur dioxide. The D/H atom ratio was 150/1. At room temperature, the organic compound was completely soluble. The reaction mixture was heated for 24 hours at 75° C.

The product was dissolved in 200 ml. of xylene and chromatographed on a 10 mm. x 300 mm. column. Elution was very slow with xylene, so the solvent was changed to 50% ethyl acetate/50% cyclohexane (by volume). Elution then was quite rapid and 600 ml. of blue-fluorescent solution was collected. Evaporation and recrystallization from 5 ml. of 50% ethyl acetate/50% cyclohexane gave 0.0157 g. of pale yellow crystals.

The infrared spectrum of the product indicated that the structure was

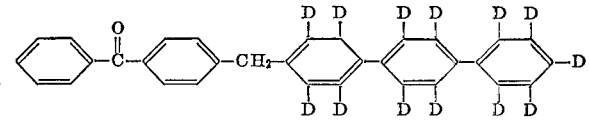

The yield on the basis of this composition was $3.59 \times 10^{-5}$ mole, 61%.

Example XII.—Picene in sulfur dioxide

An ampoule was charged with 0.0350 g. ($1.26 \times 10^{-4}$ mole) of picene, 5.0 ml. (10 g., 0.059 mole) of $$D_3PO_4 \cdot BF_3$$

and 8 ml. of liquid sulfur dioxide. The D/H atom ratio was 100/1. The ampoule was heated for 44 hours at 100° C.

The product was dissolved in 400 ml. of xylene and was chromatographed on a 10 mm. x 260 mm. column. After a nonfluorescent forecut of 50 ml., 700 ml. of blue-fluorescent solution was collected.

The fluorescent solution contained 25%-deuterated picene. The yield of $C_{22}H_{10.5}D_{3.5}$ (average molecular formula) was 0.0130 g. ($4.61 \times 10^{-5}$ mole), 37%.

Example XIII.—Picene in ortho-dichlorobenzene

The quantities were the same as in Example XII, but ortho-dichlorobenzene was substituted for the sulfur dioxide and the reaction time was cut to 24 hours.

The product was 90%-deuterated picene. The yield of $C_{22}H_{1.4}D_{12.6}$ was 0.0261 g. ($8.97 \times 10^{-5}$ mole), 71%.

Example XIV.—1,2-benzocoronene in ortho-dichlorobenzene

An ampoule was charged with 0.0200 g. ($5.72 \times 10^{-5}$ mole) of 1,2-benzocoronene, 4.0 ml. (8.0 g., 0.047 mole) of $D_3PO_4 \cdot BF_3$, and 12 ml. of ortho-dichlorobenzene. The D/H atom ratio (disregarding the hydrogen of o-dichlorobenzene) was 175/1. The ampoule was heated at 75° C. for 48 hours.

The product was dissolved in 600 ml. of xylene and chromatographed on a 10 mm. x 260 mm. column. After a nonfluorescent forecut of 100 ml., 750 ml. of blue-fluorescent solution was collected.

The fluorescent solution contained 100%-deuterated 1,2-benzocoronene, according to infrared analysis. The yield of $C_{28}D_{14}$ was 0.0083 g. ($2.3 \times 10^{-5}$ mole), 40%.

Example XV

Example XIV was repeated with the reaction time cut to 24 hours at 75° C. 50%-deuterated 1,2-benzocoronene was obtained. The yield of $C_{28}H_7D_7$ (average molecular formula) was 0.0100 g. ($2.80 \times 10^{-5}$ mole), 49%.

Example XVI. — 1,2,3,4,6,7,12,13 - tetrabenzopentacene (also named tetrabenzo[a, c, hi, qr]pentacene) in ortho-dichlorobenzene An ampoule was charged with 0.0151 g. ($3.34 \times 10^{-5}$ mole) of 1,2,3,4,6,7,12,13-tetrabenzopentacene, 6 ml. of orthodichlorobenzene, and 1.9 ml. (3.8 g., 0.022 mole) of $D_3PO_4 \cdot BF_3$. The D/H atom ratio (disregarding the hydrogen of ortho-dichlorobenzene) was 100/1. The ampoule was heated at 100° C. for 48 hours.

The product was dissolved in 300 ml. of xylene and chromatographed on a 10 mm. x 250 mm. column. After a non-fluorescent forecut of 325 ml., 1500 ml. of blue-fluorescent solution was collected. The fluorescent solution contained 0.0093 g. of 30%-deuterated 1,2,3,4,6,7,12,13-tetrabenzopentacene Yield of $C_{36}H_{14}D_6$ (average molecular formula) was $2.03 \times 10^{-5}$ mole, 61%.

Example XVII.—1,2,6,7-dibenzopyrene (also named dibenzo[fg,op]naphthacene) in ortho-dichlorobenzene An ampoule was charged with 0.0200 g. ($6.62 \times 10^{-5}$ mole) of 1,2,6,7-dibenzopyrene, 8 ml. of ortho-dichlorobenzene, and 3.9 ml. (7.8 g., 0.046 mole) of $D_3PO_4 \cdot BF_3$ The D/H atom ratio was 150/1 (disregarding the hydrogen of ortho-dichlorobenzene). The ampoule was heated at 100° C. for 36 hours.

The product was recrystallized from 3 ml. of xylene to give 0.0122 g. of 30%-deuterated 1,2,6,7-dibenzopyrene. The yield of $C_{24}H_{10}D_4$ (average molecular formula) was $3.99 \times 10^{-5}$ mole, 60%.

Example XVIII.—1,2,3,4,5,6 - tribenzanthracene (also named tribenz[a, c, h]anthracene in sulfur dioxide An ampoule was charged with 0.0300 g. ($9.14 \times 10^{-5}$ mole) of 1,2,3,4,5,6-tribenzanthracene, 6 ml. of liquid sulfur dioxide, and 4.1 ml. (8.2 g., 0.049 mole) of $D_3PO_4 \cdot BF_3$. The D/H atom ratio was 100/1. The ampoule was heated at 50° C. for 24 hours.

The product was dissolved in 160 ml. of xylene and chromatographed on a 10 mm. x 250 mm. column. The first 315 ml. of eluted solution contained 0.0151 g. of pale yellow solid. Mass spectrometry showed that the product was 89%-deuterated 1,2,3,4,5,6-tribenzanthracene. Yield of $C_{26}H_{1.8}D_{14.2}$ (average molecular formula) was $4.41 \times 10^{-5}$ mole, 48%.

I claim:

1. The method of deuterating or tritiating polycyclic aromatic compounds which comprises: mixing, heating, and thereby reacting,
   a polycyclic aromatic compound having at least four fused aromatic rings or containing at least 3 non-fused conjugated aromatic rings, the melting point of which compound is between about 100° C. and about 400° C., and
   $H_3PO_4 \cdot BF_3$ at least a substantial proportion of the hydrogens of which are of mass number greater than one, in the presence of an inert solvent for said aromatic compound, said solvent being selected from the group consisting of sulfur dioxide and aromatic compounds, having electrophilic substituents influencing each ring hydrogen of mass 1 at least about as strongly as the electron attractive effect of the two chlorine substituents in ortho-dichlorobenzene, said solvent being inert because it is free from readily exchangeable hydrogen,
   and thereby exchanging at least about 25 atom percent of the hydrogens on the polycyclic aromatic compound for deuterium or tritium.

2. The method of claim 1 in which the heating of the reaction mixture is to a temperature between about 50° C. and 150° C.

3. The method of claim 2 in which the atom ratio of exchangeable D to H in the mixture is at least about 0.33 to 1.

4. The method of claim 3 in which the atom ratio of exchangeable D to H in the reaction mixture is at least about 100 to 1.

5. The method of claim 1 in which the solvent is selected from the group consisting of sulfur dioxide and ortho-dichlorobenzene.

6. The method of claim 1 in which said solvent is an aromatic compound in which each ring hydrogen of mass 1 is fixed by ring substituents having electron-attracting substituents at least about as strong as the combination of the two chlorine atoms in ortho-dichlorobenzene.

7. The method of deuterating 1,2,5,6-dibenzocoronene to replace about 98% of the hydrogen with deuterium which comprises:
   mixing, heating about 75° C. for about 24 hours, and thereby reacting
   (a) 1,2,5,6-dibenzocoronene and
   (b) $D_3PO_4 \cdot BF_3$
   (c) in the presence of anhydrous sulfur dioxide in the ratio of about 1.94 parts (a) to 451 parts (b) to 460 parts (c), by weight,
   thereby obtaining perdeutero 1,2,5,6-dibenzocoronene, about 98% deuterated.

8. The method of deuterating 1,2-benzocoronene to replace substantially all of the hydrogen with deuterium which comprises:
   mixing, heating and thereby reacting
   (a) 1,2-benzocoronene and
   (b) $D_3PO_4 \cdot BF_3$
   (c) in the presence of ortho-dichlorobenzene, as an inert solvent free from readily exchangeable hydrogen,
   at an atom ratio of D to H of at least about 100 to 1, thereby obtaining perdeutero 1,2-benzocoronene.

References Cited

UNITED STATES PATENTS 3,230,261  11/1966  Yavorsky et al. __ 260—668 XR

DELBERT E. GANTZ, Primary Examiner

C. R. DAVIS, Assistant Examiner